United States Patent [19]

Smith

[11] Patent Number: 4,830,898

[45] Date of Patent: May 16, 1989

[54] EXTRUDED VINYL MOLDING INCORPORATING A STIFFENER

[75] Inventor: Andrew C. Smith, Edwardsburg, Mich.

[73] Assignee: Sterling Engineered Products Inc., Maumee, Ohio

[21] Appl. No.: 133,329

[22] Filed: Dec. 16, 1987

[51] Int. Cl.⁴ .............................................. E06B 7/16
[52] U.S. Cl. ................................... 428/122; 29/527.4; 49/490; 264/177.2; 428/358
[58] Field of Search ......................... 428/31, 122, 358; 29/527.4; 264/177.2; 49/490

[56] References Cited

U.S. PATENT DOCUMENTS

| | | | |
|---|---|---|---|
| 3,167,825 | 2/1965 | Zoller | 428/122 X |
| 3,547,515 | 12/1970 | Shanok et al. | 428/31 X |
| 4,042,741 | 8/1977 | Bright | 428/122 X |
| 4,232,081 | 11/1980 | Pullan | 428/99 X |
| 4,339,860 | 7/1982 | Hayashi | 428/31 X |
| 4,355,448 | 10/1982 | Ezaki | 428/122 X |
| 4,411,941 | 10/1983 | Azzola | 428/122 |
| 4,432,166 | 2/1984 | Weimar | 428/122 X |
| 4,617,220 | 10/1986 | Ginster | 428/122 |
| 4,643,923 | 2/1987 | Bernitz et al. | 428/122 X |
| 4,695,499 | 9/1987 | Whitener | 428/122 |
| 4,699,837 | 10/1987 | Bright | 428/122 |

Primary Examiner—Henry F. Epstein
Attorney, Agent, or Firm—Marshall & Melhorn

[57] ABSTRACT

A composite channel-shaped trim strip for application to a flange such as around the doors and windows of automotive vehicles, and a method for fabricating the trim strip. A perforated stiffener is incorporated in the trim strip to impart shape retention while facilitating bending and distortion thereof to the desired configuration. A rigid barrier member is interposed between the perforated stiffener and the corresponding external surface of the trim strip as the trim strip is fabricated to prevent carryover of the perforated pattern of the stiffener to the external surface. An aesthetically pleasing pattern may then be embossed upon the surface.

19 Claims, 1 Drawing Sheet

EXTRUDED VINYL MOLDING INCORPORATING A STIFFENER

BACKGROUND OF THE INVENTION

1. Field of the Invention

The present invention pertains generally to trim strips for application to edges, flanges, joints and the like such as commonly found around the door and window openings of automotive vehicles. More particularly, it pertains to such trim strips incorporating a stamped metal carrier or stiffener and which are free of the surface inconsistencies, or peak and valleys, heretofore characteristic of such strips, and to a method for manufacturing such trim strips.

2. Description of the Prior Art

Trim elements or strips of the aforedescribed type which are commonly employed, among other places, around the window and door openings of automotive vehicles, include a portion of channel-shaped cross-section and generally comprise a core member of stiffener as of sheet metal embedded in a surrounding body of a rubber-like material such as a synthetic resin. Such trim strips are generally formed as a continuous extrusion and are disclosed, for example, in U.S. Pat. Nos. 4,232,081 to Pullan and 4,432,166 to Weimar. The function of the core member or stiffener is to afford shape retention to the composite structure. The structure must nevertheless be sufficiently flexible and deformable as to be readily adaptable to the configuration of the support member to which it is to be applied. Thus, the embedded stiffener must not prevent the trip strip from being readily bent and twisted to a desired configuration, nor buckle upon such bending and twisting.

To that end, the stiffener may comprise a network of perforated, slotted, woven or expanded metal or similar material having spaces and interconnecting portions. When thus formed into a channel shape and embedded in the surrounding body of rubber-like material or synthetic resin, the core member or stiffener maintains the desired channel shape of the trim strip, and yet the composite structure is capable of being readily bent and shaped about its longitudinal axis to the desired configuration. Channel-shaped trim members having stamped metal stiffeners are disclosed, for example, in U.S. Pat. Nos. 4,339,860 to Hayashi and 4,355,448 to Ezaki. While they exhibit the aforementioned advantages over similar trim strips having a solid metal stiffener, it has been found that when the stamped metal stiffener is extruded into the rubber-like material or synthetic resin, the pattern of the stiffener carries over and is visible upon the surface of the extruded section. In other words, there is created on the surface a system of inconsistencies appearing as peaks and valleys and having an undesirable appearance commonly referred to in the art as a "hungry horse" pattern.

SUMMARY OF THE INVENTION

In accordance with the present invention, there is provided a composite channel-shaped trim strip, incorporating a perforated carrier or stiffener for facilitating flexing and deforming of the strip, and whose surfaces which will be visible when installed, present a pleasing appearance devoid of the pattern of the embedded stiffener. The stiffener, as of stamped metal, is preformed to correspond to the desired cross-sectional profile. The trim strip is extruded with a rigid but flexible strip, as of polyvinyl chloride, adjacent the external surface or surfaces of the perforated stiffener and between the stiffener and the face or faces of the trim strip which will be visible as installed upon a vehicle or in other end uses. The rigid intermediate strip thus prevents the pattern of the stiffener from carrying over and being visible upon the corresponding external surface of the trim strip. Since carryover of the stiffener pattern is avoided, a desirable embossed pattern may be imparted to the surface by engaging it with a metal wheel having an etched surface upon emergence of the trim strip from the extrusion die.

It is, therefore, a primary object of the invention to provide a flexible, deformable composite trim strip whose visible surfaces have a pleasing appearance.

Another object of the invention is to eliminate carryover of the pattern of the carrier or stiffener member of such a composite trim strip to the surface of the trim strip.

Another object of the invention is to provide such a trim strip which, in use, has a visible surface or surfaces with a selected, pleasing appearance.

Still another object of the invention is to provide a method for producing such a trim strip having a stiffener as of stamped metal incorporated in a vinyl profile, with a rigid strip between the metal stiffener and at least one surface of the vinyl profile.

Other objects and advantages of the invention will become more apparent during the course of the following description, when taken in connection with the accompanying drawing.

BRIEF DESCRIPTION OF THE DRAWING

In the drawing, wherein like numerals refer to like parts throughout.

DESCRIPTION OF THE PREFERRED EMBODIMENT

Figure 1:
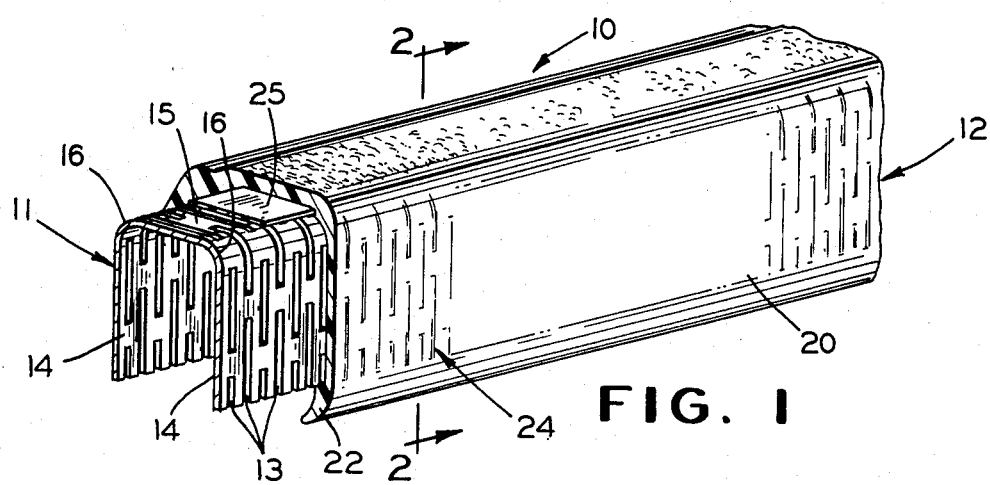
FIG. 1 is a perspective view, partly broken away, of a segment of trim strip embodying the invention.

Referring now to the drawings, there is shown generally at 10 a segment of a composite trim strip constructed in accordance with the invention. The illustrated trim strip is of a configuration commonly employed around window or door openings of present day automobiles and includes a bendable, flexible, channel-shaped carrier or stiffener 11 encapsulated within a resilient matrix 12 of rubber-like material or synthetic resin, commonly a vinyl material. As hereinabove indicated, in order to provide some rigidity and retain the desired channel shape of the trim strip, the stiffener 11 preferably is formed of sheet metal, although use of other materials is fully contemplated. For example, good results can be obtained by using a synthetic resin, and particularly polypropylene for the stiffening member. It is also necessary for the trim strip to be flexible and deformable along the longitudinal axis so that it may be adapted to the contour of the flange to which it is to be affixed. To that end, the stiffener 11 is provided with transverse perforations or slits of one type or another so that it may be readily deflected and yet will retain the shape to which it is bent. As best seen in FIG. 1, in a preferred embodiment the stiffener comprises a sheet metal strip, stamped with a pattern of spaced, transversely extending unconnected slots 13, bent into the channel-shaped configuration. Thus, the carrier includes legs 14 depending from and connected to a base 15 by curved segments 16. It will be readily appreciated that while the carrier 11 has been illustrated and described herein as being of stamped sheet metal, it may likewise be fabricated of other suitable materials such as expanded metal or plastic or knitted wire, for example, which will permit the trim strip to be suitably deflected.

Figure 3:
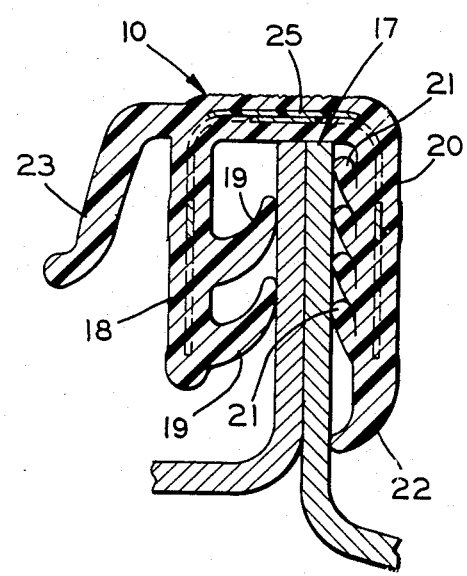
FIG. 3 is a transverse section similar to FIG. 2, illustrating a trim strip constructed in accordance with the invention applied to a metal flange.

Such composite trim strips are generally formed by extruding the resilient matrix 12, of a plastics material such as PVC, over the semi-rigid stiffener 11. As shown in FIG. 3, the particular trim strip 10 described herein is designed for application as to a flange 17 comprised of two thicknesses of sheet metal welded together. To that end the strip is formed within the channel on one of its arms 18 with inwardly directed gripper fins 19 and on the other of its arms 20 with inwardly directed gripper fins 21 for engaging the opposite surfaces of the flange 17 as the trim strip is forced thereover to retain it upon the flange. To assist in maintaining proper alignment of the trim strip upon the flange, the gripper fins 21 may be somewhat shorter and narrower, and thus more pliable, than the opposing gripper fins 19. They will thus collapse more readily than the fins 19 and, as will be apparent in FIG. 3, they cooperate with an extension 22 on the arm 20 to position and align the trim strip on the flange. The resilient matrix 12 of the trim strip may also be formed with a wing or leaf 23 adapted to sealingly engage an adjacent body member (not shown) such as a glazing closure, frame member or door when installed upon the flange 17.

As heretofore described, in conventional composite extrusions of this type the pattern of the metal stiffener carries over to the surface of the extruded section to create a ribbed or so-called "hungry horse" effect as depicted at 24 in FIG. 1. On areas of the molding strip which will be concealed from view when in use, the ribbed effect on the surface is of no particular significance. However, on those areas which will be visible, the ribbed effect has been found to not present a pleasing appearance, and its presence is thus undesirable. Furthermore, it has been found that due to the proximity of the perforated carrier or stiffener 11 to the surface of the resilient matrix 12, the ribbed effect cannot be satisfactorily eliminated by merely embossing the surface with another pattern to obliterate it.

Figure 2:
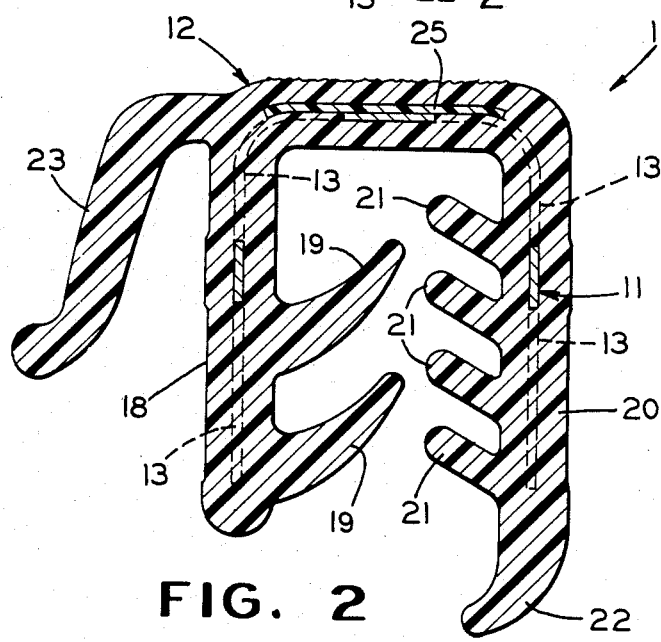
FIG. 2 is a transverse section taken substantially along line 2—2 of FIG. 1.

In accordance with the present invention, carryover of the pattern of the metal stiffener to the adjacent surface of the trim strip is prevented by interposing a rigid barrier member between the stiffener and external surface as the trim strip is extruded. Thus, as best seen in FIGS. 1 and 2, there is provided adjacent the outer surface of the stiffener a relatively rigid barrier strip 25 of a suitable flexible material. The barrier strip may be of any material exhibiting the necessary qualities of rigidity and flexibility which is compatible with the matrix 12 and stiffener 11 imbedded therein, and may advantageously be a preformed strip of a material having a composition the same as or similar to the matrix. By way of example, the matrix and barrier strip may be of polyvinyl chloride, with the barrier strip being interposed as a preformed strip during fabrication of the composite trrim strip to isolate the surface of the trim strip from the pattern of the stiffener. The barrier strip will only be necessary along those faces which are to be exposed to view when the trim strip is installed. Thus, for example, in the illustrated embodiment the barrier strip 25 extends along the base 15 of the stiffener between the curved segments 16 since it is desired to avoid the ribbed effect on only that portion of the trim strip. A barrier strip such as required for the illustrated embodiment may suitably be on the order of 0.018 inch (0.46 mm) thick and 0.400 inch (10.2 mm) wide. It is fully contemplaed that the barrier strip may be interposed at any location around the stiffener where it is desired to prevent formation of the ribbed surface effect so long as it does not adversely affect other desired properties of the trim strip, e.g., the bendable nature thereof in a certain direction or plane. The barrier strip functions to isolate the pattern of the stiffener from the adjacent external portion of the trim strip as it is formed, and thus the pattern does not carry over to create a ribbed effect on the corresponding surface of the trim strip.

Figure 4:
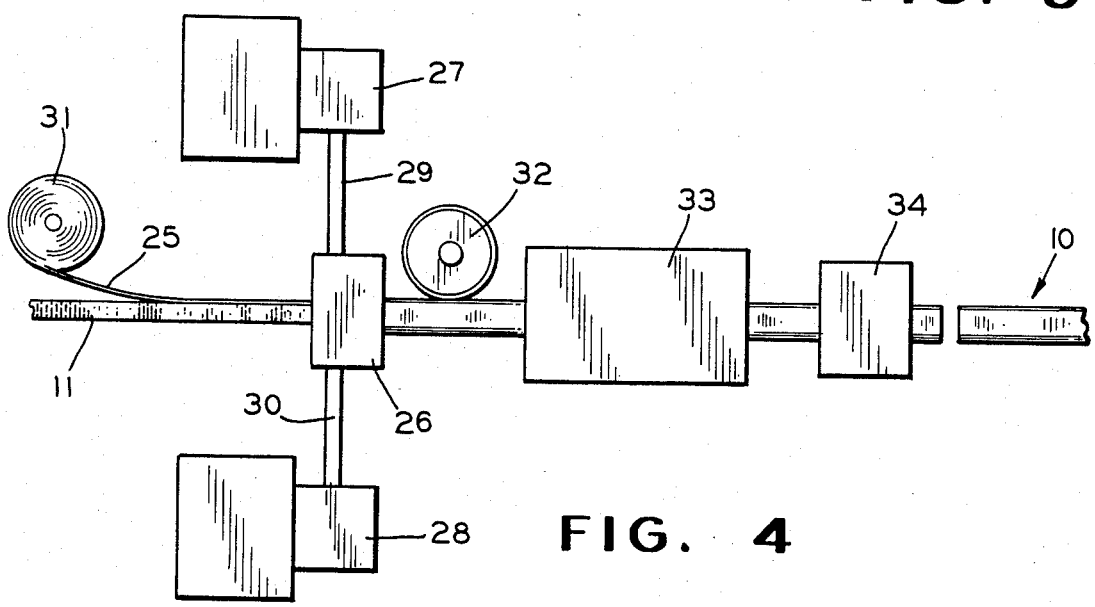
FIG. 4 is a schematic illustration of one form of apparatus suitable for fabricating the novel trim strip of the invention.

While the novel trim strip may be suitably formed in a number of ways, there is illustrated schematically in FIG. 4 one system particularly adapted to fabrication of a trim strip in accordance with the invention. As shown therein an extrusion die 26, configured to produce the desired profile, is mounted between first and second extruders 27 and 28 respectively. The first extruder may supply material through a cross-over pipe 29 for the body of the part, while the second extruder supplies material through a cross-over pipe 30 for the wing 23 and gripper fins 19 and 21. The composition of the material supplied by the two extruders may differ, of course, in order to provide the particular characteristics desired in the different parts, ie. hardness, rigidity, resilience, etc. The carrier or stiffener 11, preformed to correspond to the profile of the trim strip 10, enters a tapered section at the rear of the extrusion die 26. The barrier strip 25, supplied from a continuous roll 31, is positioned on the appropriate surface of the stiffener and enters the extrusion die with the stiffener. The material entering the die from the extruders encases the stiffener and barrier strip, and the composite strip emerges from the extrusion die 26 having the desired profile as shown in FIG. 2. Since the barrier strip 25 is interposed betwee the base 15 of the stiffener and the adjacent external surface of the profile, the profile is formed essentially as though the base was not perforated. Thus, the pattern of the perforations in the base of the stiffener does not significantly affect the surface of the profile.

Although the ribbed effect created by carryover from the stiffener is eliminated, it may be desirable to provide an aesthetically pleasing pattern on the surface which is to be visible other than that which is provided by the extrusion die. To that end, as the trim strip or profile emerges from the extrusion die in a softened state, the surface may be engaged by an embossing wheel 32 having an etched pattern thereon which will impart a corresponding aesthetically pleasing embossed pattern to the surface. The continuous extrusion may then conventionally pass through a water tank 33 to be cooled, and finally cut into segments of desired length as by a saw 34.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

What is claimed is:

1. A molded composite trim strip for application to a flange such as on automotive vehicles, comprising a semi-rigid stiffener member embedded within a body of flexible, resilient material, said stiffener member including at least one wall presenting an irregular outwardly facing surface, said irregular surface being covered by a layer of said flexible, resilient material defining a corresponding external surface of said trim strip, and a barrier strip positioned between said irregular surface of said wall and said external surface of said trim strip for precluding carryover of the pattern of said irregular surface to said external surface of said trim strip.

2. A composite trim strip as claimed in claim 1, wherein said wall includes a series of perforations defining said irregular surface.

3. A composite trim strip as claimed in claim 2, wherein said wall including said series of perforations comprises a stamped sheet metal member.

4. A composite trim strip as claimed in claim 1, wherein said barrier strip comprises rigid polyvinyl chloride.

5. A composite trim strip as claimed in claim 3, wherein said barrier strip comprises rigid polyvinyl chloride.

6. A composite trim strip as claimed in claim 1, comprising a preformed channel-shaped stiffener member extruded into said body of flexible, resilient material, said stiffener member including a base section with depending legs, said wall presenting said irregular, outwardly facing surface comprising said base section, and said barrier strip being disposed along said irregular surface.

7. A composite trim strip as claimed in claim 6, including a series of perforations in said wall defining said irregular surface.

8. A composite trim strip as claimed in claim 7, wherein said stiffener member is comprised of stamped metal.

9. A composite trim strip as claimed in claim 8, wherein said perforations comprise spaced, elongated, transversely extending slots in said wall.

10. A composite trim strip as claimed in claim 9, wherein said barrier strip comprises a strip of rigid polyvinyl chloride disposed along said wall and covering said slots.

11. A composite trim strip as claimed in claim 6, wherein said body of flexible, resilient material comprises polyvinyl chloride.

12. A composite trim strip as claimed in claim 10, wherein said body of flexible, resilient material comprises polyvinyl chloride and including an embossed pattern on said external surface of trim strip outwardly of said barrier strip.

13. A method of forming a molded composite trim strip of the type employed on automotive vehicles, comprising the steps of directing a preformed semi-rigid stiffener member including a wall presenting an irregular outwardly facing surface, into an extrusion die, positioning a rigid barrier strip along said irregular outwardly facing surface before said stiffener member enters said extrusion die, supplying the matrix material for said trim strip to said die, and extruding said trim strip from said die with said stiffener member and said rigid barrier strip embedded in said matrix material whereby said barrier strip inhibits carryover of the pattern of said irregular surface from said stiffener member to the corresponding external surface of said trim strip.

14. A method of forming a composite trim strip as claimed in claim 13, wherein said stiffener member comprises a channel-shaped section of stamped metal.

15. A method of forming a composite trim strip as claimed in claim 14, including a series of spaced, transversely extending slots in said stiffener member defining said irregular surface.

16. A method of forming a composite trim strip as claimed in claim 13, wherein said rigid barrier strip is comprised of polyvinyl chloride.

17. A method of forming a composite trim strip as claimed in claim 13, wherein said matrix material is polyvinyl chloride.

18. A method of forming a composite trim strip as claimed in claim 15, wherein said rigid barrier strip and said matrix are comprised of polyvinyl chloride, and said barrier strip is deposited on the surface of said stiffener member over said slots.

19. A method of forming a composite trim strip as claimed in claim 18, including the step of imparting an embossed pattern to said corresponding external surface as said trim strip emerges from said extrusion die.

* * * * *